(12) United States Patent
Sime et al.

(10) Patent No.: US 10,330,193 B2
(45) Date of Patent: Jun. 25, 2019

(54) VEHICLE PROPULSION SYSTEM AND METHOD FOR A VEHICLE

(71) Applicant: GM GLOBAL TECHNOLOGY OPERATIONS LLC, Detroit, MI (US)

(72) Inventors: Karl A Sime, Mason, MI (US); Randall B Dlugoss, Royal Oak, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 129 days.

(21) Appl. No.: 15/584,349

(22) Filed: May 2, 2017

(65) Prior Publication Data

US 2018/0320785 A1 Nov. 8, 2018

(51) Int. Cl.
| | |
|---|---|
| *B60W 10/02* | (2006.01) |
| *F16H 61/14* | (2006.01) |
| *F16H 63/46* | (2006.01) |
| *B60W 10/11* | (2012.01) |
| *B60W 30/18* | (2012.01) |

(52) U.S. Cl.
CPC ........... *F16H 61/143* (2013.01); *B60W 10/02* (2013.01); *F16H 63/46* (2013.01); *B60W 10/11* (2013.01); *B60W 30/181* (2013.01); *B60W 30/18018* (2013.01); *B60W 30/18027* (2013.01); *B60W 2510/0638* (2013.01); *B60W 2510/0685* (2013.01); *B60W 2710/021* (2013.01); *F16D 2500/3026* (2013.01); *F16D 2500/3041* (2013.01); *F16D 2500/3067* (2013.01); *F16D 2500/30402* (2013.01); *F16D 2500/30406* (2013.01); *F16D 2500/30408* (2013.01); *F16H 2312/14* (2013.01); *Y10T 477/6437* (2015.01); *Y10T 477/753* (2015.01); *Y10T 477/78* (2015.01)

(58) Field of Classification Search
CPC ............... Y10T 477/753; Y10T 477/78; Y10T 477/6437; F16D 2500/3067; F16D 2500/3041; F16D 2500/30408; B60W 10/02; B60W 30/18018; B60W 30/18027; B60W 30/181; B60W 2510/0638; B60W 2510/0685; B60W 2710/021
See application file for complete search history.

(56) References Cited

U.S. PATENT DOCUMENTS

| | | |
|---|---|---|
| 7,415,350 B2 | 8/2008 | Nishikiori |
| 7,739,018 B2 | 6/2010 | Adachi |
| 8,543,318 B2 | 9/2013 | Ma |

(Continued)

FOREIGN PATENT DOCUMENTS

| | | | |
|---|---|---|---|
| DE | 10331151 A1 | 1/2005 | |
| EP | 2738058 A1 * | 6/2014 | ............... B60K 6/48 |

*Primary Examiner* — Roger L Pang

(57) ABSTRACT

A vehicle propulsion system includes an engine including a crankshaft and adapted to generate torque, a crankshaft sensor that outputs a signal that is indicative of a rotary position of the crankshaft, a transmission with a clutch that is connected to the engine to receive the torque from the engine, a drive member connected to the transmission to receive torque from the transmission, and a controller that commands operation of the clutch based upon the signal from the crankshaft sensor for controlling engine compression pulse disturbances as the engine speed changes from an elevated rpm to low or zero rpm as well as low or zero rpm to an elevated rpm.

16 Claims, 4 Drawing Sheets

(56) References Cited

U.S. PATENT DOCUMENTS

| | | |
|---|---|---|
| 8,702,565 B2 | 4/2014 | Abboud |
| 9,080,542 B2 * | 7/2015 | Nefcy ................... B60W 20/00 |
| 9,393,954 B2 * | 7/2016 | Gibson ................. F02D 41/022 |
| 9,421,970 B2 * | 8/2016 | Tsukada ................. B60K 6/445 |
| 9,587,614 B2 | 3/2017 | Rychlinski |
| 2016/0176404 A1 | 6/2016 | Dlugoss |
| 2016/0272191 A1 | 9/2016 | Atluri |

* cited by examiner

VEHICLE PROPULSION SYSTEM AND METHOD FOR A VEHICLE

FIELD

The present disclosure relates to vehicle propulsion system and method for a vehicle.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

In order to minimize idle fuel consumption, some vehicle propulsion systems selectively cut off the supply of fuel and spark to an internal combustion engine when the vehicle would otherwise be idling. As the engine speed is reduced during an engine stop process, in a four stroke engine each cylinder tends to capture and compress a volume of air during the compression stroke. Following the compression stroke as the piston reverses direction after reaching top dead center in the cylinder, the trapped volume of higher pressure air expands and applies a force to the piston during the combustion stroke. This compression and expansion results in accelerations, variances, bumpiness or "jerkiness" in the profile of the engine speed as the engine slows from idle speed to being fully stopped. In other words, the engine speed profile is not completely smooth. As a result, this jerkiness may cause an undesirable vibration. Further, vibrations at a frequency within a range near a resonant or harmonic frequency may amplify vibrations such that they might be felt by an occupant of the vehicle. Similar issues arise in multiple types of engines including, for example, diesel or other types of engines, without limitation.

SUMMARY

In an exemplary aspect, a vehicle propulsion system includes an engine including a crankshaft and adapted to generate torque, a crankshaft sensor that outputs a signal that is indicative of a rotary position of the crankshaft, a transmission with a clutch that is connected to the engine to receive the torque from the engine, a drive member connected to the transmission to receive torque from the transmission, and a controller that commands operation of the clutch based upon the signal from the crankshaft sensor during a transition between an engine operating condition and an engine stop condition.

In another exemplary aspect, the controller commands operation of the clutch in response to the signal from the crankshaft sensor indicating a predetermined position of a piston within a cylinder within the engine.

In another exemplary aspect, the controller controls the clutch operation to activate the clutch to reduce a pulse in an engine speed profile.

In another exemplary aspect, the engine further includes a piston in a cylinder connected to the crankshaft and wherein the controller commands operation of the clutch to engage during one of a compression stroke and a combustion stroke of the piston.

In another exemplary aspect, the crankshaft sensor signal includes an absolute engine position relative to top dead center of a piston within a cylinder in one of a combustion stroke and a compression stroke of the piston.

In another exemplary aspect, the controller compensates for an inherent delay in a hydraulic clutch control system by commanding actuation of the clutch by a predetermined amount of time prior to top dead center.

In another exemplary aspect, the controller commands operation of the clutch such that the clutch only partially engages.

In another exemplary aspect, the controller commands operation of the clutch above a predetermined engine speed.

In another exemplary aspect, the predetermined engine speed corresponds to a lower engine speed within a predetermined range of engine speeds.

In another exemplary aspect, the predetermined range of engine speeds corresponds to range in which a frequency of a plurality of pulses approximates a resonant or harmonic frequency of the propulsion system.

In this manner, a signal generated by a crankshaft sensor may be reliably used to coordinate application of a transmission clutch to eliminate and/or reduce pulses in an engine speed profile as the engine transitions between an operating speed and a full stop, whether it is during an engine stop process or engine start process, without limitation.

Further, even in a hybrid type of vehicle propulsion system that may have one or more electric motors which may be used to adjust the engine speed profile during an engine stop or start process, use of a transmission clutch may further supplement the ability of the electric motor to control the engine speed profile. This may be especially helpful in a mild-hybrid type of vehicle propulsion system which may include an electric motor having a reduced capacity in comparison to a strong hybrid which may have a more powerful motor. The assistance of the clutch in removing or eliminating pulses in the engine speed profile may enable the use of a smaller electric motor and battery.

Further, reduction of pulses in an engine speed profile during an engine stop or start process may be improved even in the absence of an electric motor such as a non-hybrid type vehicle propulsion system. Hybrid propulsion systems have increased requirements in comparison to non-hybrid propulsion systems. For example, not only does a hybrid propulsion system require an electric motor, but those systems also require higher voltage electrical systems and energy storage systems to support the use of those electric motors. The present invention provides the ability to reduce the pulses in an engine speed profile during an engine stop or start process for non-hybrid propulsion systems, thereby avoiding the additional complexity and cost of a hybrid propulsion system.

Additionally, the temperature in the transmission may be increased more quickly to bring it up to an optimal operating temperature by converting energy from the engine, by reducing the pulses in the engine speed profile, into heat in a clutch within the transmission. This then provide an additional source of heat to the transmission which may further improve the overall fuel economy of the vehicle.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
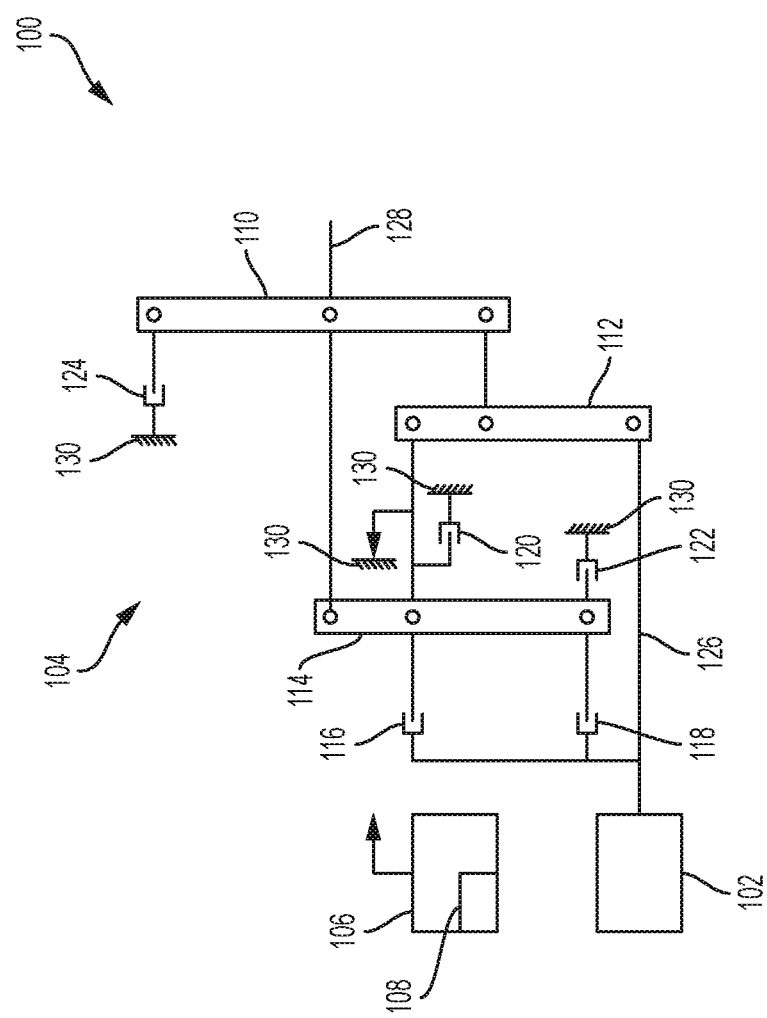
FIG. 1 is a schematic lever diagram of an exemplary vehicle propulsion system in accordance with the present invention.

FIG. 1 is a schematic lever diagram of an exemplary vehicle propulsion system 100 in accordance with the present invention. The system 100 includes an engine 102 and a transmission 104. A controller 106 executes an exemplary method 108 to mitigate pulses in the engine speed profile during an engine stop or start process. The controller 106 mitigates the pulses by controlling the actuation of one or more clutches in the transmission 104. While FIG. 1 illustrates a six speed automatic transmission as an exemplary embodiment, the propulsion system 100 may include any type of transmission such as, for example, a dual clutch transmission, or any other type of automatic transmission having any number of available gear ratios which includes a controllable clutch that is capable of slowing the engine speed when engaged without limitation.

The transmission 104 includes a first planetary gear set 110, a second planetary gear set 112, and a third planetary gear set 114. The transmission 104 further includes a first clutch 116, a second clutch 118, a third clutch 120, a fourth clutch 122, and a fifth clutch 124. The engine 102 includes a crankshaft 126 and a crankshaft sensor (not shown). The engine 102 delivers an input torque via the crankshaft 126 to the transmission 104. The engine 102 may be selectively shut down to reduce idle fuel consumption and restarted when appropriate. The transmission 104 includes an output shaft 128 connected to a drive member (not shown). The output shaft 128 provides an output torque to the drive member for propelling the vehicle. The transmission further includes a plurality of grounding points 130 which may represent a connection to a stationary part such as a transmission housing or the like without limitation.

The controller 106, which controls operation of the clutches in the transmission 104, may be configured as a microprocessor based device and may be a single processor or may share processing and control across a distributed network of controllers. Any combination or configuration of controller(s), singular or plural, including those distributed across a network may embody the controller 106 without limitation. For example, in one exemplary embodiment, the controller 106 may form a combination of an engine control module (ECM) in communication with a transmission control module (TCM) across a controller area network (CAN).

In one exemplary mode, the controller 106 may control actuation of the second clutch 118 and fourth clutch 122 such that the friction from these clutches opposes the rotation of the engine crankshaft 126, thereby controllably reducing the speed of the engine 102. In a similar manner, in alternative exemplary mode, the controller 106 may control actuation of the third clutch 120 and the first clutch 116 such that the friction from these clutches acts to provide a torque that opposes the rotation of the engine crankshaft 126, thereby controllably reducing the speed of the engine 102. Any combination of engagement of the clutches in the transmission by the controller 106 which acts to slow the rotation of the engine 102 forms an exemplary embodiment of the present invention without limitation.

In an exemplary mode, the controller 106 may control actuation of the clutches so that they are "feathered" which corresponds to a precisely controlled slip rate and slip rate change. In general, the clutches are "grounded" such that they control slip relative to a stationary element, such as, for example, a transmission case.

Further, while the detailed description describes the invention in use during an engine stop process, it is to be understood that the invention is also applicable during an engine start process. The controller controls the clutches to reduce engine disturbances in the speed profile regardless of whether the engine speed profile declines or increases.

In one exemplary embodiment the present invention may synchronize the clutch apply/release based upon the frequency of pulses received from a crankshaft sensor (thereby indicating engine speed) and controlling a clutch or clutches to provide a periodic anti-disturbance pulse train to counteract or cancel engine speed disturbance using an open loop control system. In yet another exemplary embodiment, the controller may control an apply and release of a clutch in a feedback controller based upon each pulse received in a crankshaft sensor signal. Further, the controller may utilize a feed forward approach that relies upon the crankshaft sensor signal frequency to adjust apply amplitude and synchronization.

Figure 2:
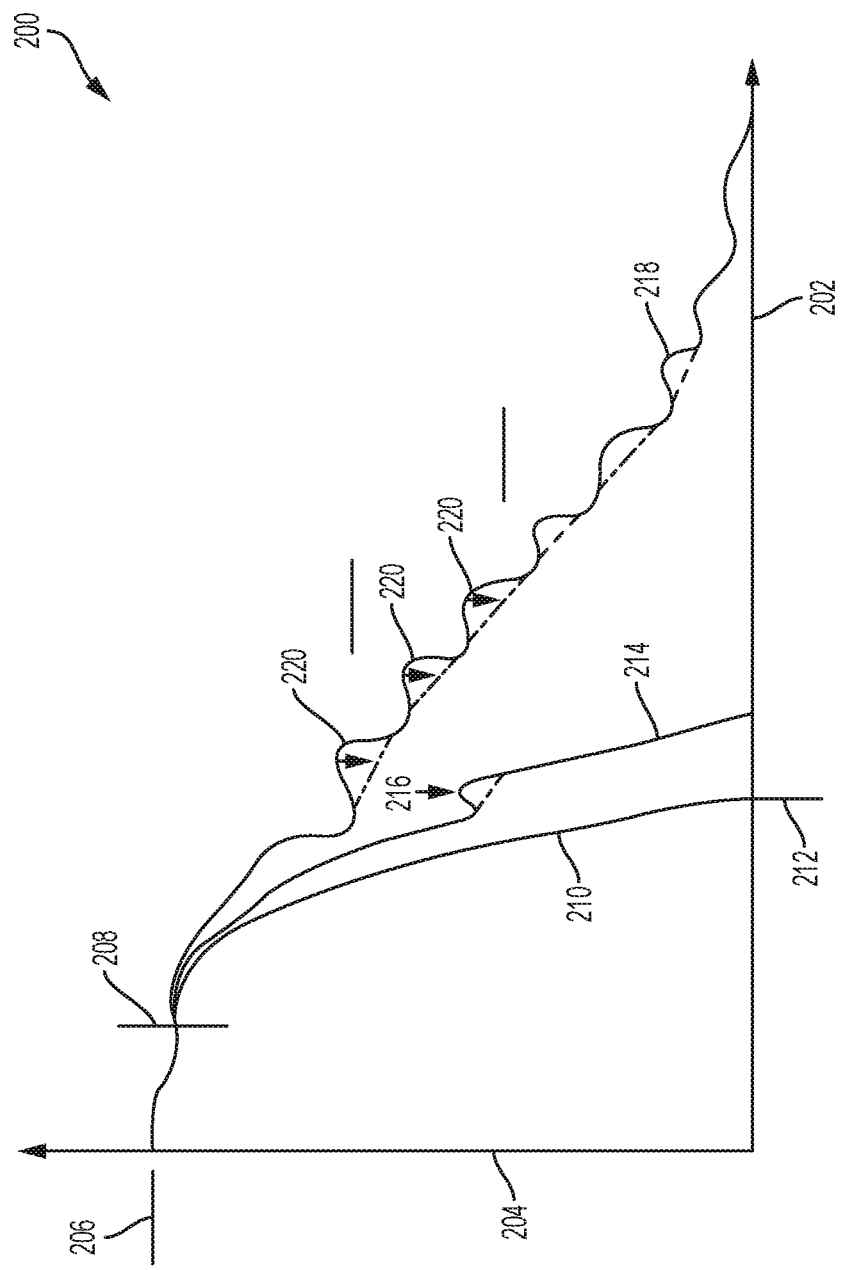
FIG. 2 is a graph illustrating exemplary engine speed profiles during an engine stop process.

FIG. 2 illustrates a graph 200 of exemplary engine speed profiles during an engine stop process. The horizontal axis 202 represents the passage of time and the vertical axis 204 represents the engine speed. The engine speed during an engine stop process may initiate at an idle speed 206 at time 208. A first engine speed profile 210 brings the speed of the engine rapidly down from the idle speed 206 to a full stop at time 212. Such a rapid decline in engine speed may be possible in a vehicle having a strong hybrid propulsion system which relies upon a relatively powerful electric motor. However, such a propulsion system requires a relatively high voltages system which may not be available in many vehicle propulsion systems. Another limitation on such a rapid decline in engine speed is the possibility of propulsion system damage. Reducing the engine speed too rapidly may bottom out the springs on the damper which might result in damage.

A second engine speed profile 214 includes a less rapid decline in engine speed than the first engine speed profile 210. However, the second engine speed profile 214 includes a pulse 216 where the acceleration of the engine varies and, in this instance, the engine speed momentarily increases during the pulse 216. As explained earlier, the cause of such variation in the acceleration of engine speed during an engine stop process is generally attributable to the compression and subsequent expansion of a volume of air within a cylinder of the engine as the engine crankshaft rotates. This compression of a volume of air tends to resist the motion of the piston in the cylinder which may oppose the rotation of the engine. Following the compression and after the piston arrives at top dead center in the cylinder, the compressed air expands and applies a force against the piston which may result in an acceleration in the engine speed. This pulse 216 may cause a vibration in the propulsion system that might be felt by an occupant of the vehicle which may be undesirable.

A third engine speed profile 218 includes an even less rapid decline in engine speed than the first engine speed profile 210 or the second engine speed profile 214. As is clearly illustrated, the third engine speed profile 218 includes a plurality of pulses 220. As explained above, the pulses 220 are generally attributable to the compression and expansion of gas within the cylinders of the engine as the engine rotates and, in particular, as each cylinder transitions between a compression stroke and an expansion (or combustion) stroke. Individually, any single pulse 220 may not be enough to induce a vibration in the propulsion system which might be noticed by a vehicle occupant. However, the series of pulses 220 in the engine speed profile 218 may result in a frequency of accelerations which may approach a resonant or harmonic frequency of the propulsion system. In such a situation, the plurality of pulses 220 may have a frequency which results in an undesirable amplification of the accelerations that increases the vibration until it might be detectable by a vehicle occupant. For example, in an exemplary propulsion system having an idle speed of about 600 revolutions per minute (RPM), a range of frequencies, which may result in an undesirable amplification of vibrations, may be between an engine speed of about 350 RPM and 250 RPM. A plurality of pulses 220 in the engine speed profile 218 which occur within this range of engine speeds may result in an undesirable excitation of the vibration of the propulsion system. In contrast, the single pulse 216 in the second engine speed profile 214 might not cause an excitation within that resonant frequency zone. It is desirable to eliminate or reduce the pulses 216 and 220 to minimize and/or prevent vibrations from being generated and transmitted to occupants of the vehicle.

Figure 3:
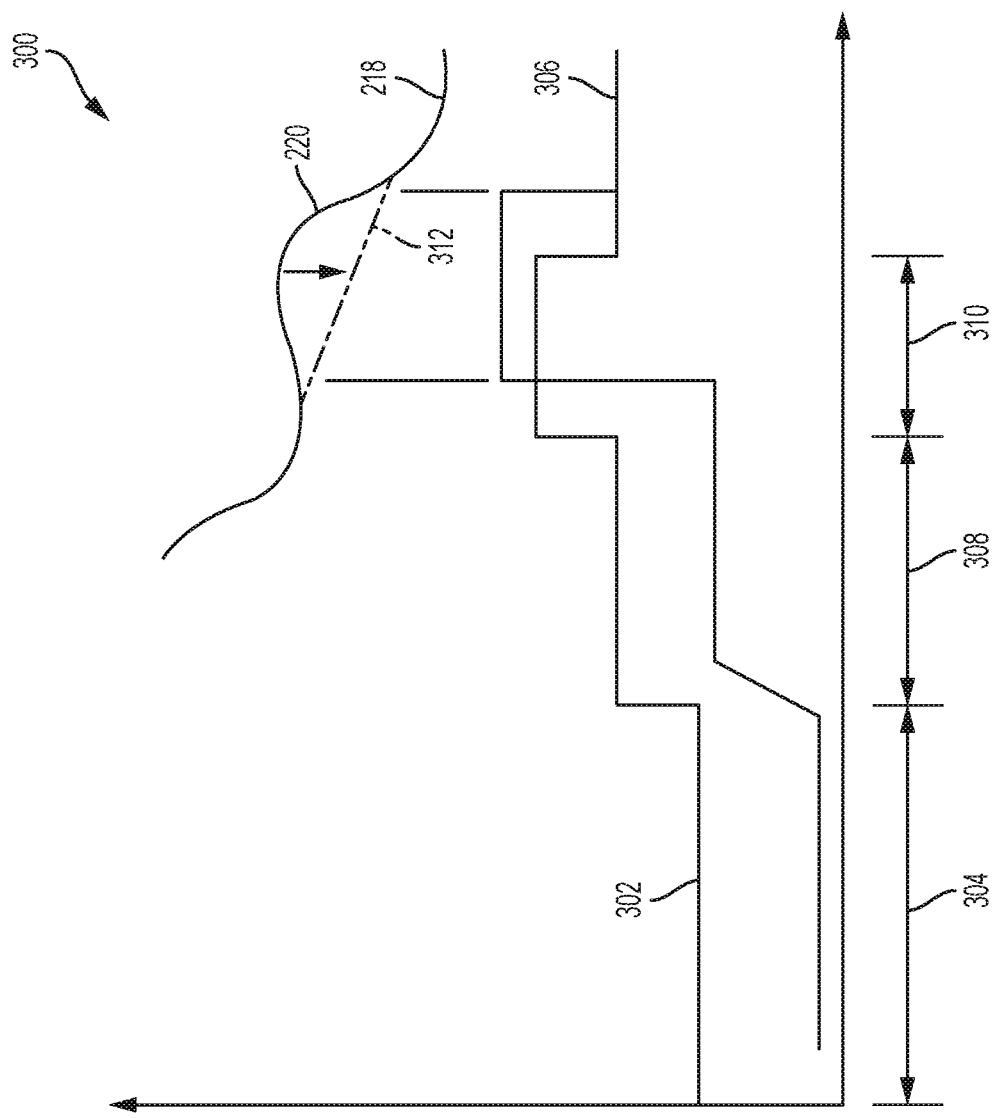
FIG. 3 is a graph illustrating an exemplary transmission clutch control in accordance with the present invention.

FIG. 3 is a graph illustrating an exemplary transmission clutch control in accordance with the present invention. The control system and method provides a clutch control scheme 302 which includes multiple phases. The graph 300 also illustrates a clutch pressure 306 that corresponds to an amount of drag and/or friction that results from the corresponding clutch. A first phase 304 of the scheme 302 controls the clutch to reside in a released configuration such that the clutch pressure 306 is minimal or substantially zero. The controller receives a signal from the engine crankshaft sensor and based upon that signal is able to determine an approaching combustion stroke for a cylinder in the engine (i.e. the piston is about to pass top dead center). In response, the controller commands the clutch control scheme 302 to transition to a staged-phase 308. In a staged-phase 308 the clutch pressure increases to a configuration in which the clutch is very close to an engaged position. In other words, the staged-phase 308 entry places the clutch into a configuration in which it is ready to quickly engage, but has not yet engaged. The level of staging may be calibrated based upon multiple factors such as, for example, the temperature of the hydraulic oil. Alternatively, the controller may command entry into the staged-phase 308 in response to a message or signal that the engine is preparing to initiate an engine stop process.

When the crankshaft sensor provides a signal to the controller that indicates entry into a combustion stroke for a cylinder in the engine (e.g., top dead center), the controller commands the clutch control scheme 302 to transition into an apply phase 310. During the apply phase 310, the clutch pressure 306 increases such that a drag or friction is applied which opposes the torque received from the engine such that the pulse in the engine speed profile is reduced and/or prevented. In a preferred embodiment, the clutch is not fully applied, rather, the clutch is "feathered" or only lightly applied such that the friction is only sufficient to reduce the pulse and not so much as to fully engage, lock up or "tie-up" the clutch.

As illustrated in FIG. 3, there is an inherent delay between the entry into the apply phase 310 in the clutch control scheme 302 and when the clutch pressure 306 rises sufficiently to actually apply the clutch. This delay is due to the inherent characteristics of the hydraulic clutch system. In a preferred embodiment, the controller anticipates and compensates for this delay by entering the apply phase 310 a sufficient amount of time before the corresponding piston transitions past top dead center which enables alignment of the actual apply of the clutch to coincide with a combustion stroke.

FIG. 3 includes a corresponding portion of the third engine speed profile 218. In the absence of the application of the clutch, the engine speed profile 218 would include a pulse 220. However, application of the clutch results in a corrected engine speed profile 312 which minimizes and/or eliminates the pulse 220 from the profile 312. When the engine position indicated by the crankshaft sensor moves past the combustion stroke, the controller may then command the clutch control scheme 302 to release the clutch pressure 306 back to a staged-configuration which maintains the clutch in a ready condition for application when the next combustion is entered or placed into a fully released configuration.

Further, the controller may complete release the clutch in response to the engine speed dropping below a predetermined threshold. For example, the pulse mitigation might not be necessary once the engine speed drops below a range of speeds adjacent or proximate to an excitation frequency or frequencies.

As explained earlier, the cause of the pulse(s) 220 in an engine speed profile is generally attributable to the compression and expansion of air within a cylinder of the engine. It is well understood that the compression and expansion of gas is directly related to the position of the engine which is indicated by the crankshaft sensor. In this manner, a signal generated by the crankshaft sensor may be reliably used to coordinate application of a transmission clutch to eliminate and/or reduce pulses in an engine speed profile during an engine stop process. In a preferred embodiment, the crankshaft sensor provides a signal that indicates a piston being positioned at a top dead center in its corresponding cylinder within the engine.

Figure 4:
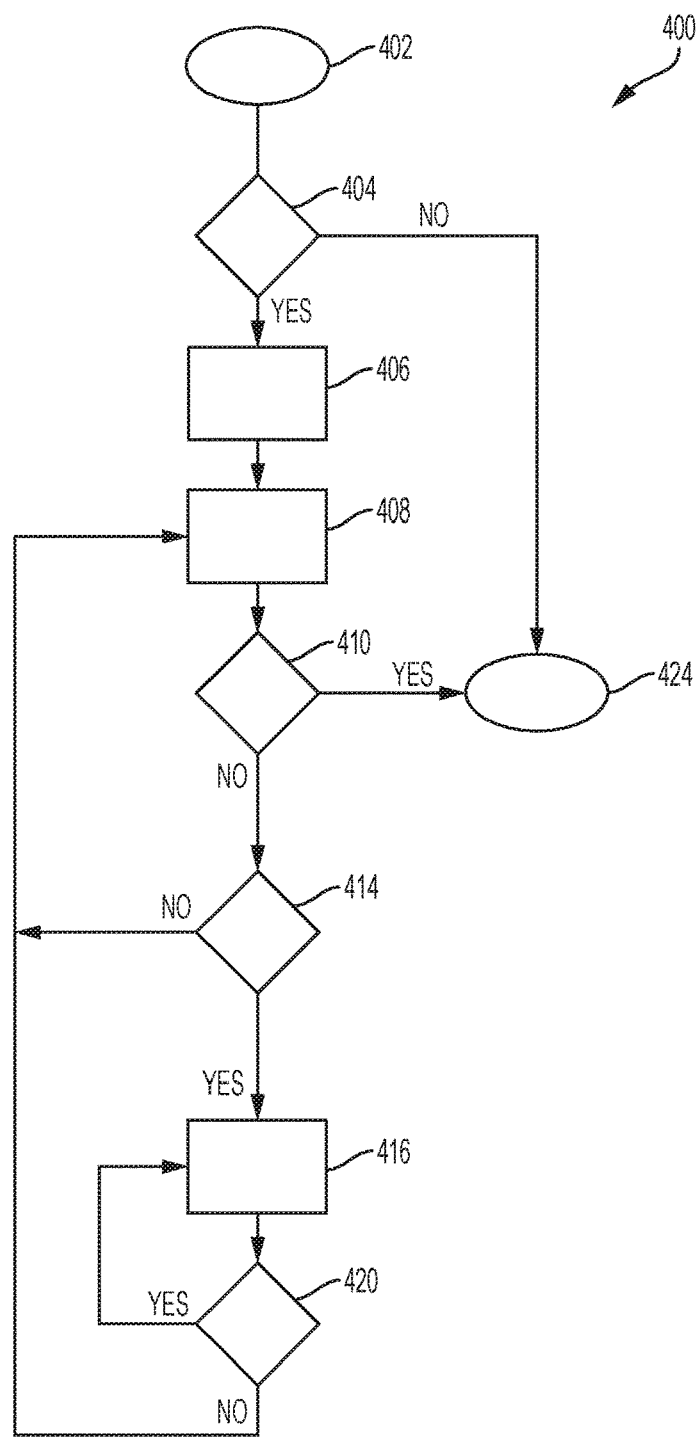
FIG. 4 is a flowchart of an exemplary method in accordance with the present invention.

FIG. 4 is a flowchart 400 of an exemplary method in accordance with the present invention. The method starts at step 402 and continues to step 404. In step 404, the method determines whether an engine stop process is being initiated. If, in step 404, the method determines that an engine stop process is being initiated then the method continues to step 406. If, however, in step 404, the method determines that an engine stop process is not being initiated, then the method continues to step 424 where the method stops. In step 406, the method stages a clutch in a transmission to prepare it for quick engagement and the method then continues to step 408. Optionally, and not shown, the method may also include a step where staging is confirmed before continuing. In step 408, the method receives a signal from the crankshaft sensor and continues to step 410. In step 410, the method determines whether an engine speed is below a predetermined threshold based upon the crankshaft sensor signal. If, in step 410, the method determines that the engine speed is not below the threshold, then the method continues to step 414. If, however, in step 410, the method determines that the engine speed is below the threshold, then the method continues to step 424 where the method stops.

In step 414, the method determines whether the crankshaft sensor signal indicates an engine position corresponding to a top dead center position of a piston within a cylinder within the engine. If, in step 414, the method determines that the crankshaft position signal indicates an engine position corresponding to top dead center, then the method continues to step 416. In step 416, the method applies the clutch and continues to step 420. If, however, in step 414, the method determines that the crankshaft position signal indicates an engine position that does not correspond to a combustion stroke of a cylinder within the engine, then the method returns to step 408.

In step 420, the method determines whether the crankshaft sensor signal continues to indicate that the engine position corresponds to a combustion stroke of a cylinder within the engine. If, in step 420, the method determines that the crankshaft position signal continues to indicate an engine position corresponding to a combustion stroke of a cylinder within the engine, then the method returns to step 416. If, however, in step 420, the method determines that the crankshaft position signal does not indicate an engine position corresponding to a combustion stroke of a cylinder within the engine, then the method returns to step 408.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle propulsion system, the system comprising:
   an engine including a crankshaft and adapted to generate torque;
   a crankshaft sensor that outputs a signal that is indicative of a rotary position of the crankshaft;
   a transmission with a clutch that is connected to the engine to receive the torque from the engine;
   a drive member connected to the transmission to receive torque from the transmission; and
   a controller that commands operation of the clutch based upon the signal from the crankshaft sensor during a transition between an engine operating condition and an engine stop condition, wherein the controller commands operation of the clutch such that the clutch only partially engages, and wherein the controller commands operation of the clutch above a predetermined engine speed.

2. The system of claim 1, wherein the controller commands operation of the clutch in response to the signal from the crankshaft sensor indicating a predetermined position of a piston within a cylinder within the engine.

3. The system of claim 1, wherein the controller controls the clutch operation to activate the clutch to reduce a pulse in an engine speed profile.

4. The system of claim 1, wherein the engine further includes a piston in a cylinder connected to the crankshaft and wherein the controller commands operation of the clutch to engage during one of a compression stroke and a combustion stroke of the piston.

5. The system of claim 4, wherein the crankshaft sensor signal comprises an absolute engine position relative to top dead center of a piston within a cylinder in one of a combustion stroke and a compression stroke of the piston.

6. The system of claim 4, wherein the controller compensates for an inherent delay in a hydraulic clutch control system by commanding actuation of the clutch by a predetermined amount prior to top dead center.

7. The system of claim 1, wherein the predetermined engine speed corresponds to a lower engine speed within a predetermined range of engine speeds.

8. The system of claim 7, wherein the predetermined range of engine speeds corresponds to range in which a frequency of a plurality of pulses approximates a resonant frequency of the propulsion system.

9. A method for controlling a vehicle propulsion system that includes an engine including a crankshaft and adapted to generate torque, a crankshaft sensor that outputs a signal that is indicative of a rotary position of the crankshaft, a transmission with a clutch that is connected to the engine to receive the torque from the engine, a drive member connected to the transmission to receive torque from the transmission, and a controller that commands operation of the clutch based upon the signal from the crankshaft sensor, the method comprising:
   determining whether the vehicle propulsion system is transitioning from an engine operating condition to an engine stop condition; and
   controlling operation of the clutch when the vehicle propulsion system transitions between an engine operating condition and an engine stop condition, wherein controlling operation of the clutch only partially engages the clutch, and wherein controlling operation of the clutch is above a predetermined engine speed.

10. The method of claim 9, wherein controlling operation of the clutch is in response to the signal from the crankshaft sensor indicating a predetermined position of a piston within a cylinder within the engine.

11. The method of claim 9, wherein controlling operation of the clutch reduces a pulse in an engine speed profile.

12. The method of claim 9, wherein the engine further includes a piston in a cylinder connected to the crankshaft and wherein controlling operation of the clutch is during one of a compression stroke and a combustion stroke of the piston.

13. The method of claim 12, wherein the crankshaft sensor signal comprises an absolute engine position relative to top dead center of a piston within a cylinder in one of a combustion stroke and a compression stroke of the piston.

14. The method of claim 12, wherein controlling operation of the clutch compensates for an inherent delay in a hydraulic clutch control system by commanding actuation of the clutch by a predetermined amount of time prior to top dead center.

15. The method of claim 9, wherein the predetermined engine speed corresponds to a lower engine speed within a predetermined range of engine speeds.

16. The method of claim 15, wherein the predetermined range of engine speeds corresponds to range in which a frequency of a plurality of pulses approximates a resonant frequency of the propulsion system.

* * * * *